United States Patent Office 2,792,427
Patented May 14, 1957

---

2,792,427

DEALKYLATION OF 2,5-TERT-ALKYLPHENOLS

James R. Hoatson, Clarendon Hills, and Robert H. Rosenwald, Western Springs, Ill., assignors to Universal Oil Products Company, Des Plaines, Ill., a corporation of Delaware No Drawing. Application October 16, 1953,
Serial No. 386,673

10 Claims. (Cl. 260—613)

This application is a continuation-in-part of our copending application Serial No. 129,528 filed November 25, 1949, now Patent No. 2,676,191, April 20, 1954, relating to a process for the dealkylation of a particular class of phenolic compounds containing tert-alkyl substituents in the 2 and the 5 positions. More particularly, and in the preferred application of the process, the invention concerns the dealkylation of 2,5-di-tert-alkylphenols containing an alkoxy substituent para to the hydroxyl group of the phenol.

In the alkylation of p-alkoxyphenols with an alkylating agent containing a tert-alkyl group for the intended production of a mono-substituted tert-alkylphenol, the tert-alkyl group occupying the ortho position relative to the hydroxyl group of the phenol, it is found that an appreciable yield of the di-tert-alkyl substituted alkoxyphenol is obtained in which the alkyl groups occupy ortho and meta positions relative to the hydroxyl group or ortho positions relative to the hydroxyl and p-alkoxyl groups respectively. The compounds of the class characterized as meta-tert-alkyl-p-alkoxyphenols, and particularly the meta-tert-butyl-p-methoxyphenols are known for their oxidation inhibiting potency and for stabilizing organic compounds against oxidation and the development of rancidity therein. The corresponding 2,5-tert-alkyl-4-alkoxyphenols are much less potent as oxidation inhibitors and it therefore becomes desirable to convert the 2,5-di-tert-alkyl compound, invariably formed as a by-product in the alkylation of the p-alkoxyphenol starting material, to the mono-alkyl substituted, 3-tert-alkyl-p-alkoxyphenol. By the selective dealkylation of the 2-tert-alkyl group from the 2,5-di-tert-alkyl substituted compound the yield of the desired 3-tert-alkyl-4-alkoxyphenol is thereby increased from a given charge of p-alkoxyphenol starting material. The present selective dealkylation process provides a convenient and effective means for the attainment of that objective.

In one of its embodiments this invention concerns a process for selective dealkylation of a 2,5-di-tert-alkylphenol containing a substituent other than hydroxyl group in the p-position which comprises subjecting said di-tert-alkylphenol to a temperature above about 200° C., and separating the resulting mono-alkyl substituted 3-tert-alkylphenol from the dealkylation reaction mixture.

Other embodiments of the invention relating to specific aspects of the dealkylation process will be referred to in greater detail in the following further description.

The present dealkylation process is particularly directed to the production of 3-tert-alkyl-p-alkoxyphenols from the corresponding 2,5-di-tert-alkyl derivatives for the reasons hereinabove indicated, especially where the mono-tert-alkyl derivative in which the alkyl group is meta with respect to the hydroxyl group is a more potent and preferred product compared to the di-tert-alkyl derivative, as in the case of oxidation inhibitors, hereinabove noted. The present process is, however, also effectively applied when it is desired to dealkylate a 2,5-di-tert-alkylphenol containing no substituent para to the hydroxyl group or to compounds containing a substituent other than an alkoxyl radical para to the hydroxyl group. Thus, a 2,5-di-tert-alkylphenol, such as 2,5-di-tert-butylphenol, 2,5-di-tert-amylphenol, 2-tert-amyl-5-tert-butylphenol etc., and compounds of corresponding structure in which the para position of the phenol is additionally substituted with diverse substituents may likewise be utilized as charging stocks in the present dealkylation process. 2,5-di-tert-alkylphenols of the latter class are represented, for example, by such compounds in which the p-substituent is a nitro, alkylthio, amino, cyano, halo, keto, nitroso, etc., radical, exemplified by such compounds as 2,5-di-tert-butyl-4-alkylthiophenol, 2,5-di-tert-butyl-4-nitrophenol, 2,5-di-tert-butyl-4-chlorophenol, 2,5-di-tert-amyl-4-aminophenol, etc. These phenolic derivatives, as well as the preferred p-alkoxy derivatives, have the following empirical formula:

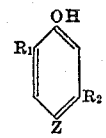

in which $R_1$ and $R_2$ are tert-alkyl groups and Z represents a radical other than an hydroxyl group. In the case of the preferred p-alkoxy substituted compounds utilizable herein as charging stocks, Z represents an alkoxyl group, and the compounds having the following empirical formula:

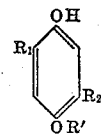

in which R' may be an alkyl group, primary, secondary or tertiary in structure preferably containing not more than about 8 carbon atoms per group, such as methyl, ethyl, propyl, isopropyl, butyl, isobutyl, sec-butyl, tert-butyl, amyl, isoamyl, sec-amyl, tert-amyl, etc., while $R_1$ and $R_2$ may be tert-alkyl groups preferably containing not more than about 8 carbon atoms per group, such as tert-butyl, tert-amyl, 2,2-di-methyl butyl, 2,2-di-methyl amyl, etc. When the present dealkylation process is operated to produce the preferred oxidation inhibitors by dealkylation of the 2-tert-alkyl group from a 2,5-di-tert-alkyl-4-alkoxyphenol, the alkyl group of the alkoxyl radical is preferably a relatively short chain group, such as methyl, ethyl, propyl and isopropyl, the latter compounds having a greater degree of inhibiting potency.

Dealkylation of the selected phenolic compounds as charging stocks in accordance with the present process is effected by subjecting the di-tert-alkylphenol or a p-substituted derivative thereof to a temperature of above 200° C. and preferably from about 200° to about 400° C. The specific temperature to be employed will be selected depending upon the boiling point of the mono-tert-alkylphenolic product, as required to obtain economical manufacture of the product within a reasonable reaction time.

The dealkylation process of the present invention may be effected by either batch or continuous methods of production. In the simple batch procedure, a given charge of the 2,5-di-tert-alkylphenol derivative utilized as charging stock herein, is heated to the indicated thermal dealkylation temperature for a time sufficient to establish equilibrium in the alkyl transfer reactions occurring during the dealkylation process. The thermal method of dealkylation may be operated continuously by distilling from the di-tert-alkylphenol starting material the mono-tertalkyl dealkylation product at reduced pressure, if necessary to obtain the desired dealkylation temperature, while concommitantly charging to the dealkylation reactor additional di-tert-alkylphenol starting material. By means of suitable recycle arrangements, substantially 100% conversion of the di-tert-alkylphenol starting material may be converted to the mono-tert-alkylphenol product.

The dealkylation process of the present invention is illustrated with reference to a specific embodiment thereof in the following example, which however, is not intended to unduly restrict the scope of the invention in accordance therewith.

*Example I*

In the following run 2,5-di-tert-butyl-4-methoxy-phenol was subjected to thermal dealkylation at a temperature of from about 225° to about 260° C. by continuous fractional distillation at atmospheric pressure. The fractions were collected and analyzed by infra-red analysis to determine the proportion of various dealkylation products in the distillate. The first fraction, consisting of about 30% by volume of the original charge boiled at atmospheric pressure from about 225° to about 254° and contained 16% by weight of 4-methoxy-phenol, 44% by weight of 2-tert-butyl-4-methoxyphenol, about 33% by weight of 3-tert-butyl-4-methoxyphenol and about 7% by weight of 2,5-di-tert-butyl-4-methoxyphenol charging stock. A second fraction boiling from about 254° to about 259° C. comprising about 35% by weight of the charging stock contained approximately 8% by weight of 4-methoxyphenol, about 3% by weight of 2-tert-butyl-4-methoxyphenol, about 85% by weight of 3-tert-butyl-4-methoxyphenol, and about 4% by weight of 2,5-di-tert-butyl-4-methoxyphenol. A third fraction boiling at approximately 259° C. contained 2.4% by weight of 4-methoxyphenol, none of the 2-tert-butyl-4-methoxyphenol, approximately 94% by weight of 3-tert-butyl-4-methoxyphenol and about 3% by weight of 2,5-di-tert-butyl-4-methoxyphenol starting material. The approximate total yield in the once-through operation of the 3-tert-butyl-4-methoxyphenol was 73% and approximately 96% by weight of the total charge of 2,5-di-tert-butyl-4-methoxyphenol was converted to lower dealkylation products.

We claim as our invention:

1. A process for the selective dealkylation of 2,5-di-tert-alkylphenol having a radical other than an hydroxyl group in the 4-position to form a 3-tert-alkyl-phenol which comprises heating said di-tert-alkylphenol to a temperature above about 200° C. in the absence of a catalyst.

2. A process for the selective dealkylation of 2,5-di-tert-alkylphenol having a radical other than an hydroxyl group in the 4-position to form a 3-tert-alkyl-phenol which comprises heating said di-tert-alkylphenol to a temperature of from about 200° to about 400° C. in the absence of a catalyst.

3. The process of claim 2 further characterized in that said tert-alkyl groups contain not more than 8 carbon atoms per alkyl group.

4. The process of claim 3 further characterized in that said tert-alkyl groups are tert-butyl.

5. The process of claim 2 further characterized in that said radical is a substituent for hydrogen.

6. The process of claim 5 further characterized in that said substituent is an alkoxy group.

7. A process for the selective dealkylation of a phenolic compound having the empirical formula:

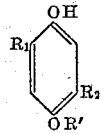

in which $R_1$ and $R_2$ are tert-alkyl groups containing not more than 8 carbon atoms per group and $R'$ is an alkyl group to form thereby a 3-tert-alkyl-4-alkoxyphenol which comprises heating said phenolic compound to a temperature of from about 200° to about 400° C.

8. The process of claim 7 further characterized in that said $R_1$ and $R_2$ alkyl groups are tert-butyl.

9. The process of claim 7 further characterized in that said $R'$ group is an alkyl group containing not more than 3 carbon atoms.

10. The process of claim 7 further characterized in that $R_1$ and $R_2$ alkyl groups are tert-butyl and said $R'$ group is methyl.

References Cited in the file of this patent

UNITED STATES PATENTS 2,470,902  Rosenwald    May 24, 1949

OTHER REFERENCES

Industrial & Eng. Chem. vol. 36 (1944), pg. 596, 1 page.